United States Patent
Rimola

(10) Patent No.: US 9,843,422 B2
(45) Date of Patent: Dec. 12, 2017

(54) DEVICE CONTROL PROTOCOL (OVER IPP)

(71) Applicant: KONICA MINOLTA LABORATORY U.S.A., INC., San Mateo, CA (US)

(72) Inventor: Carlos Rimola, Campbell, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 182 days.

(21) Appl. No.: 14/984,940

(22) Filed: Dec. 30, 2015

(65) Prior Publication Data

US 2017/0195094 A1    Jul. 6, 2017

(51) Int. Cl.
| | |
|---|---|
| *H04L 5/00* | (2006.01) |
| *H04L 29/06* | (2006.01) |
| *H04N 1/327* | (2006.01) |
| *H04N 1/333* | (2006.01) |
| *H04N 1/00* | (2006.01) |

(52) U.S. Cl.
CPC ............ *H04L 5/0044* (2013.01); *H04L 69/26* (2013.01); *H04N 1/0001* (2013.01); *H04N 1/00042* (2013.01); *H04N 1/00217* (2013.01); *H04N 1/32771* (2013.01); *H04N 1/33346* (2013.01); *H04N 2201/0094* (2013.01)

(58) Field of Classification Search
CPC ... H04L 5/0044; H04L 69/26; H04N 1/00042; H04N 1/33346; H04N 1/32771; H04N 1/00217; H04N 1/0001; H04N 2201/0094
See application file for complete search history.

(56) References Cited

U.S. PATENT DOCUMENTS

| | | |
|---|---|---|
| 2005/0154922 A1 | 7/2005 | Chen |
| 2014/0211248 A1* | 7/2014 | Uchikawa ............. G06F 3/1287 358/1.15 |

* cited by examiner

*Primary Examiner* — Pao Sinkantarakorn
*Assistant Examiner* — Kabir Jahangir
(74) *Attorney, Agent, or Firm* — Buchanan Ingersoll & Rooney PC

(57) ABSTRACT

A method is disclosed of encapsulating a device control protocol request for a device specific control function, the method including sending an initial request in an operation-id and a data field of an IPP request to a host device from a client device, the client device configured to support IPP client functionality; sending an initial response from the host device to the client device in a data field of the IPP response; sending a DCPI request for a requested action to the host device, wherein the DCPI request for the requested action is defined by device control protocol operation code and Type-Length-Value (TLV) fields contained in the data field of the IPP request; and sending a response to the client device, wherein the device control protocol response is contained in the data field of the IPP response and includes the status of the requested action and optional data.

20 Claims, 2 Drawing Sheets

DEVICE CONTROL PROTOCOL (OVER IPP)

FIELD OF THE INVENTION

The present disclosure relates to a method and system, which can use the Internet Printing Protocol (IPP) operation-id and data fields to encapsulate a new device control protocol to perform secure (proprietary or general) control functions on a target device, for example, a Multi-function Peripheral/Device (MFP/MFD), which supports the IPP protocol server functionality, and wherein the system and method disclosed herein is referred to as Device Control Protocol over IPP (DCPI).

BACKGROUND OF THE INVENTION

The "Printing Working Group" (PWG) is a consortium of printing and network vendors formally allied with the IEEE Industry Standards and Technology Organization (IEEE-ISTO) and responsible for the IPP specifications. PWG is in the process of defining an "IPP System Service" for general management and control purposes. DCPI complements and augments the "IPP System Service" and can be designed for vendor and device specific control purposes.

As per the Internet Engineering Task Force (IETF) IPP specifications—RFCs 2910 and 2911 (updated by RFCs 3380, 3381, 3382, 3510, 3995, 3996 and 7472), the IPP request/response header includes the following:

| Field | Length (in bytes) | Notes |
| --- | --- | --- |
| version-number | 2 | 1.0-1.1 and 2.0-2.2 |
| operation-id (request) or status-code (response) | 2 | Example operation - Print-Job. Example status - OK or bad-request |
| request-id | 4 | Used to map responses to requests |
| attribute-group(s) | n-bytes | Operation/Job attributes like color or copies |
| end-of-attributes | 1 | End marker |
| data | q-bytes | Optional |

SUMMARY OF THE INVENTION

In consideration of the above issues, it would be desirable to have a software module or software application associated with a computer device or host device such as an Multi-Function Peripheral/Device (MFP/MFD), which can be designed for more device specific control functions that are often proprietary and applicable to a specific MFP/MFD, and more particularly, a method and system that can complement the IPP System Service defined by PWG by making use of the operation-id and data fields in the IPP request/response header.

A method is disclosed of encapsulating a request for a device specific control function that causes one or more host devices to act or perform a requested action, wherein each of the one or more host devices are configured to support Internet Printing Protocol (IPP) protocol server functionality, the method comprising: sending an initial request in an operation-id field and data fields of an IPP request to a host device from a client device, the client device configured to support IPP client functionality; receiving the initial request from the client device on the host device; sending an initial response from the host device to the client device in a data field of the IPP response; receiving the initial response on the client device; sending a DCPI request for a requested action to the host device, wherein the DCPI request for the requested action is defined by an operation code (op-code) and Type-Length-Value (TLV) fields contained in the data field of the IPP request; and sending a response to the client device, wherein the response includes a status or return-code of the requested action and optional data in the TLV fields.

A non-transitory computer readable medium containing a computer program having computer readable code embodied to carry out a method of encapsulating a request for a device specific control function that causes one or more host devices to act or perform a requested action is disclosed, wherein each of the one or more host devices are configured to support Internet Printing Protocol (IPP) protocol server functionality, the method comprising: sending an initial request in an operation-id/status-code and a data field of an IPP request to a host device from a client device, the client device configured to support IPP client functionality; receiving an initial response from the host device in the operation-id/status-code and the data field of the IPP request, the initial response responding to the initial request received on the host device; sending a DCPI request for a requested action to the host device, wherein the request for the requested action is defined in an operation-code (op-code) and Type-Length-Value (TLV) fields of the DCPI request; and receiving a status or a return-code of the requested action from the host device and optional data in the TLV fields.

A non-transitory computer readable medium containing a computer program having computer readable code embodied to carry out a method of encapsulating a request for a device specific control function that causes one or more host devices to act or perform a requested action is disclosed, wherein each of the one or more host devices are configured to support Internet Printing Protocol (IPP) protocol server functionality, the method comprising: receiving an initial DCPI request in an operation-id/status-code and a data field of an IPP request from a client device, the client device configured to support IPP client functionality; sending an initial DCPI response to the client device in the data field of the IPP response; receiving a DCPI request for a requested action from the client device, wherein the request for the requested DCPI action is defined by an operation code (op-code) and Type-Length-Value (TLV) fields of the DCPI request; and sending a response to the client device, wherein the response includes a status or return-code of the requested action and optional data represented in the TLV fields.

A system is disclosed for encapsulating a request for a device specific control function that causes one or more host devices to act or perform a requested action, wherein each of the one or more host devices are configured to support Internet Printing Protocol (IPP) protocol server functionality, the system comprising: a client device, a Multi-Functional Peripheral (MFP), and a communication network, which connects the client device to the MFP; wherein the client device and MFP are configured to: send an initial DCPI request in the operation-id and a data field of an IPP request to a host device from a client device, the client device configured to support IPP client functionality; receive the initial DCPI request from the client device on the host device; send an initial DCPI response from the host device to the client device in the data field of the IPP response; receive the initial response on the client device; send a DCPI request for a requested action to the host device, wherein the request for the requested action is defined by the op-code and Type-Length-Value (TLV) fields contained in the data field of the IPP request; and send a DCPI response contained in the IPP data field to the client device, wherein the response includes a status or return-code of the requested action and optional data in the TLV fields, and wherein the requested action comprises one or more of the following: action operations represented in a DCPI operation-code (op-code) field, wherein the action operations are device specific control functions that cause the host device to act on or perform the requested action and return a response or return-code that indicates success or failure and optional data in the TLV fields; query operations represented in the DCPI op-code field, wherein the query actions retrieve specific and internal target MFP device data/reports; and/or sessions represented in the DCPI op-code field, wherein the sessions are continuous requests/responses containing data payloads flowing in both directions, which are exchanged between the client device and the host device.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Figure 1:
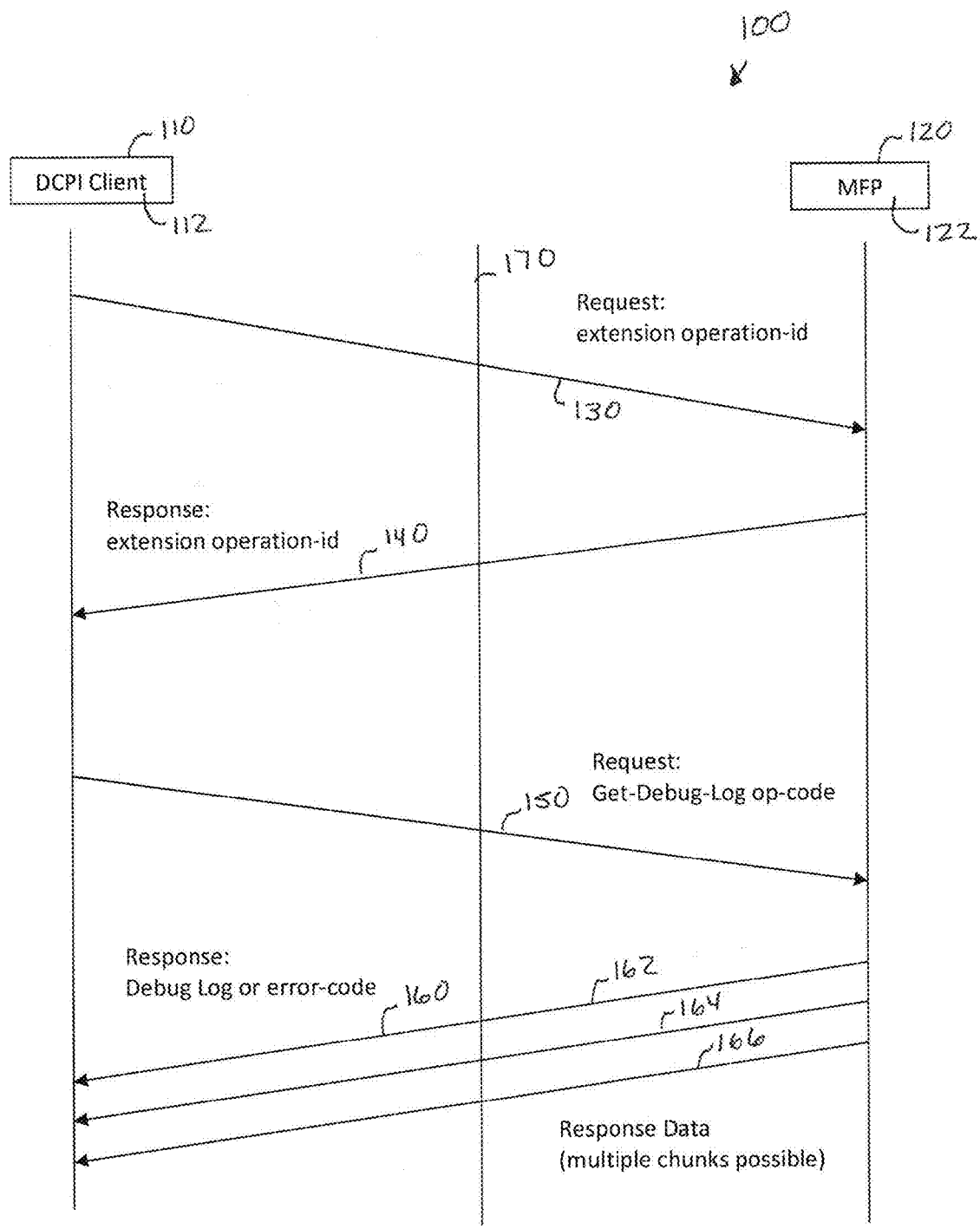
FIG. 1 is an illustration of a system having an exemplary request/response flow and client/MFP interaction in accordance with an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

In accordance with an exemplary embodiment, the disclosure can allow a manufacturer or vendor of Multi-function Peripherals/Devices (MFPs/MFDs) that support IPP server functionality to be able to perform special control operations on a target MFP using an IPP Client device, for example, over a network or medium over which IPP can be used. For example, the target device can be an MFP or a Printer, or any device that supports IPP server functionality. In accordance with an exemplary embodiment, the system and method as disclosed herein can be designed to support control and management functions that fall outside existing control and management functionality in the IPP specifications. For example, the control functions can be specific to each device or to a group of devices that share common internal software and hardware components.

In accordance with an exemplary embodiment, a method, non-transitory computer readable mediums containing a computer program, and a system, wherein the operation-id and "data" fields of the IPP protocol fields can be used to define an IPP request or response that can be used to encapsulate DCPI requests and responses as disclosed herein. For example, in the case of a request if the special (vendor extension) operation-id is used, then the request may not be an imaging function IPP request, (for example, print, scan, fax, etc.), but rather can be a DCPI request, wherein the data field of the IPP request contains the entire DCPI request including what function to perform (op-code) and function specifics or parameters (TLVs).

In accordance with an exemplary embodiment, the Operation-code (op-code) and TLVs can identify the main DCPI fields. For example, the Operation-code can define the action/function to be performed. In addition, the TLVs can define the parameters of the function to be performed. For example, in an IPP response, the operation-id field is called the status-code and it occupies the operation-id field. Similarly, in accordance with an exemplary embodiment, DCPI responses can contain a return-code that occupies the operation-code (op-code) field. DCPI responses may also contain TLVs that generally describe the various response contents, which are dependent on the type of request. In accordance with an exemplary embodiment, for example, if there is nothing being returned, then only one TLV (The end-marker) will be in the response. DCPI requests may also have no parameters in which case the only TLV is the end-marker. In accordance with an exemplary embodiment, if a DCPI request or response has parameters (TLVs), for example, in which there is no limit as to how many may be included, the recipient of the request or response, for example, can determine the end of the TLV list when it reaches a TLV end-marker as disclosed herein.

In accordance with an exemplary embodiment, for example, an MFP vendor can use the method to define and perform special functions on a specific MFP or line of MFPs that share common characteristics (hardware and software). For example, functions, which can be performed, can include special diagnostics and remote control and management.

In accordance with an exemplary embodiment, performing special control and management functions can be a common requirement in order to properly support and manage MFPs. For example, the fact that most MFPs are network enabled and connected (wired or wireless) can help enable vendors to perform control and management functions remotely, and which can be accomplished over a private network or the Internet. In addition, performing control and management functions remotely can help reduce the need for on-site visits and maintenance, resolve issues or defects on the MFP, and monitor status and health of one or more MFPs within a system or networks of MFPs.

In accordance with an exemplary embodiment, the method and systems as disclosed herein can be relatively simple, versatile, and extendable, such that the invention method can leverage on using existing methods and features, for example, the security features provided and supported by TCP/IP, HTTP and IPP. For example, in accordance with an exemplary, requests and responses (i.e., Device Control Protocol over IPP (DCPI) requests and responses) can be embedded in the data field of IPP, which can extend the capabilities of the universal printing protocol such that the method and system can be used to extend the control of the imaging capabilities (for example, print, copy, scan, and/or fax), and other used.

In accordance with an exemplary embodiment, while the emphasis of this disclosure is in connection with an MFP device control and management, the method can also be applied to other functions, such as continuous system monitoring and the retrieval of useful proprietary information from the target MFP device. For example, the proprietary information can include activity reports, debug logs, memory dumps, and other internal status, which can be specific to a given MFP.

Since the disclosed method (or DCPI) can use operation codes (op-codes) to define the function to be performed, in accordance with an exemplary embodiment, a vendor, for example, can implement its own set of commands or functions that a DCPI client can request. For example, the method as disclosed herein can also allow the use of self-descriptive parameters (Type-Length-Value fields or TLVs) that can be used to specify the details of the operation to be performed.

In accordance with an exemplary embodiment, the DCPI client can be integrated into an existing IPP client and can be implemented on any device and operating system, which can take advantage of the user interfaces supported on the client device. For example, the method and system as disclosed herein can leverage on the features of the method in which it is encapsulated, for example, HTTP and IPP. In addition, the DCPI request/response mechanism can be short, relatively simple to understand, and can include a well-defined header as well as a variable number of parameters that can allow the system and method to be used in a variety of forms. The method can also define mechanisms in which very large amounts of data can be exchanged between client and server, which can help enable the implementation of functions/operations that can retrieve or transfer data of very large size. For example, a function can be defined or implemented that burns a disc image on a secondary drive on the target MFP device.

DCPI Encapsulation

It should be noted that for MFP control purposes, the system and method as disclosed herein or DCPI, can rely on an existing IPP implementation which in turn relies on HTTP and, except for IPP-USB (IPP over USB), TCP/IP. Therefore, the protocol encapsulation of a DCPI packet can take on this form:

| Protocol | Notes |
|---|---|
| DCPI | Device Control Protocol |
| IPP | Internet Printing Protocol |
| HTTP | With TLS/SSL Encryption |
| TCP/IP | For transport, routing, reliability. |

DCPI Clients

In accordance with an exemplary embodiment, the disclosure does not specify nor restrict the device or user interface of the client. For example, the only requirement is for the client to be able to connect and communicate with a target MFP through a network or USB and that the target MFP supports IPP server functionality. Therefore, for example, the client could run the system and method as disclosed herein as an application on a given OS or mobile device using either a graphical user interface or a command line style interface.

DCPI Function Categories

The functions performed via this system and method can be categorized in three general groups:
  (1) Actions
  (2) Query/Retrieve
  (3) Session Actions In accordance with an exemplary embodiment, action operations are designed to be device specific control functions that cause the target device to act on or perform the requested action and return a response (or return-code) that indicates success or failure. For example, actions can be designed to perform a function that requires the return of little or no data besides the standard response header. Actions can include, for example,
  (1) Reset target MFP configuration to factory default;
  (2) Run specified internal command/script on target MFP;
  (3) Schedule an event on target MFP (shutdown/restart);
  (4) Run diagnostics on a particular MFP component like a hard drive; and
  (5) Initiate internal system debug logging.

In accordance with an exemplary embodiment, actions generally return only a response; however, there is nothing that precludes actions from returning data as well.

Queries/Retrievals

Query operations are designed to retrieve specific and internal target MFP device data/reports. A query response will contain a well-defined response header with success or failure status plus the requested information. Queries, which can be implemented can include, for example:
  (1) Retrieve internal/proprietary target device status.
  (2) Retrieve device specific debug log.
  (3) Retrieve diagnostic information (for example, core dump) from previous failure(s).

Sessions

A session is a special category in which continuous requests/responses containing data payloads flowing in both directions is exchanged between the DCPI client and the target MFP device. An example of a session could be one that allows remote command line control of the target MFP when other access mechanisms like Secure Shell (SSH) are not available. For example, SSH, and other protocols, cannot be used in an IPP-USB setup as IPP-USB does not use TCP/IP. For example, only HTTP+IPP protocols can be transported over IPP-USB.

This is only a subset of categories and respective actions/queries/sessions. In accordance with an exemplary embodiment, the implementer of a specific DCPI implementation can define the request/responses that best serves the needs of controlling a specific target MFP device.

DCPI Requests and Responses (Format and Usage)

Similar to IPP, the system and methods as disclosed herein (or DCPI) is a request/response protocol. For example, in accordance with an exemplary embodiment, a DCPI client issues requests to an MFP target device, which is required to support IPP Server functionality. The request contains a well-defined header and a variable length payload. For each request received, the server replies with a response, which contains a similar header and payload.

In accordance with an exemplary embodiment, the system and method or Device Control Protocol over IPP (DCPI) can use a request/response mechanism similar to that used by IPP. For example, the header for request and responses can share a common or similar format:

| Field | Length (in bytes) | Notes |
|---|---|---|
| Signature | 32 | Implementer/device specific |
| op-code (request) or return-code (response) | 2 | Action to perform (request) or Result - success/failure (response) |
| Reserved | 2 | Reserved for possible extensions |

-continued

| Field | Length (in bytes) | Notes |
|---|---|---|
| request-id | 4 | Used to map a response to a request |
| TLVs | variable number of TLVs and length of each TLV | Used to specify action specifics or parameters. |

In accordance with an exemplary embodiment, the request/response header can resemble the IPP request/response header, which can help keep the method relatively simple and familiar. In accordance with an exemplary embodiment, the fields used can be as follows:

Signature

In accordance with an exemplary embodiment, this field can be configured or designed by the implementer. For example, the signature field can be used to identify the specified device and model or simply as a unique key that verifies that the data field of an IPP request/response is being used for the purpose of embedding DCPI.

Op-code

In accordance with an exemplary embodiment, this field identifies the function to be performed on the target device. Op-codes can identify unique actions or queries. In accordance with an exemplary embodiment, for example, the range 0x0001-0x3FFF can be used for actions and the range 0x4000-0x8FFF can be used for queries and sessions.

Request-Id

Request-id is a unique identifier that can be used to match a response to a request, and which can help facilitate supporting multiple and outstanding request functions on a device.

TLVs (Type-Length-Value Fields)

A TLV can be considered a parameter that further defines the request or response. In accordance with an exemplary embodiment, for example, multiple TLVs can be included as part of a request or response with a special TLV consisting of all zeroes which defines the end of the request or response. In accordance with an exemplary embodiment, the TLV format can be as follows:

| Field | Length (in bytes) | Note |
|---|---|---|
| TLV-id | 4 | unique TLV identifier |
| value-length | 4 | number of bytes to follow |
| value/data | n-bytes | TLV content |

TLVs can be relatively simple to parse and can give an implementer (or administrator) the flexibility to specify the type of parameter, length of the parameter, and value of the parameter. In addition, this can allow the request to specify parameters, which have, for example, number values or arbitrary octets, which may represent a string or a special field.

Special TLVs

In accordance with an exemplary embodiment, special TLVs can be defined. For example, in accordance with an exemplary embodiment, a first one can mark the end of a TLV group and therefore the end of a request or response. In accordance with an exemplary embodiment, a Data Chunk TLV can be useful for transmitting large amounts of data, for example, up to, for example, 4 Gigabyte chunks/blocks. The format of the special TLVs can be as follows:

| (1) End Marker TLV | | |
|---|---|---|
| TLV-id | Length | Value |
| 0x00000000 | 0x00000004 | CRC-32 checksum |

| (2) Data Chunk TLV | | |
|---|---|---|
| TLV-id | Length | Note |
| 0xFFFFFFFF | 0x00000001-0xFFFFFFFF | n-bytes (length) data |

There are some details on the definition and usage of this "Special TLVs" that should be noted, which can include that the first TLV-End Marker TLV (1) can be relatively simple. For example, it can have a TLV-id of 0x00000000, a length value of 4 and a standard CRC-32 checksum. The checksum is computed over the entire Request including header and TLV group up to this last TLV End Marker but excluding the checksum field. The checksum may be used to guarantee the integrity of the request and response. In other words, guarantee that no data corruption has taken place during transmission.

In accordance with an exemplary embodiment, the second TLV-Data Chunk TLV (2) can have a TLV-id of 0xFFFFFFFF and a length with value range of 1 byte and up to 0xFFFFFFFF (4,294,967,295) bytes. The purpose of this ID is to be used when the size of data to be returned is very large and will not fit in a single TLV. For example, several Data Chunk TLVs can be used to transmit data lager than 0xFFFFFFFF octets/bytes.

In accordance with an exemplary embodiment, transmitting a file/data that exceeds the maximum Length value (0xFFFFFFFF) does not require HTTP chunked transfer encoding which is often used for large or unknown size data transfers. For example, a method of transferring a very large file/data can be accomplished using this TLV (id=0xFFFFFFFF) repeatedly until the entire data has been sent and the TLV End Marker is reached.

In accordance with an exemplary embodiment, the two "special" TLVs presented here illustrate the flexibility and expandability that DCPI allows through the use of TLVs as embedded parameters in the DCPI payload. In accordance with an exemplary embodiment, an implementer can define its own TLVs to fit the special needs of a specific DCPI function. For example, TLVs can also be paired or grouped together to form more complex parameters.

IPP Operation-Id (Usage and Assignments)

The operation-id (op-id) field of an IPP request is the field that defines that an IPP request carries a DCPI request in the IPP data field. The PWG IPP RFCs and specifications define the valid assigned numbers for IPP Operation IDs. The highest operation-id currently in use is 0x004A (decimal 74).

In accordance with an exemplary embodiment, the valid ranges as published by PWG are as follows:

| IPP operation-id range | Note |
|---|---|
| 0x0000-0x0001 | Reserved, not used |
| 0x0002-0x004F | Range of operations currently assigned/in use |
| 0x0050-0x3FFF | Reserved for future IETF/PWG operations |
| 0x4000-0x8FFF | Reserved for vendor extensions |

DCPI IPP Operation-Id (Usage and Negotiation)

For the purpose of this disclosure, only one operation-id is needed to identify a DCPI operation. For example, the ID can be from the vendor-extensions range. The PWG allows "Vendors" (MFP, Printers, Etc.) to request the reservation of one or more vendor-extensions Operation-IDs.

In accordance with an exemplary embodiment, for example, the first operation-id used for DCPI requests can be named, for example, DCPI Client-Server-Control is 0x6FFF. This operation can be used together with a message at the start of the data portion of the IPP request to negotiate the operation ID to be used for subsequent communication. A single TLV will be passed which will consist of an id of 0x00000001, a length of 2 and a value of 0x6FFF. A PWG assigned vendor-extensions operation-id can also be used. The response from the IPP server to the initial message will contain a single TLV with the same format containing the operation-id to be used by the client in subsequent DCPI Client-Server-Control operations. In accordance with an exemplary embodiment, for example, the server may return the same operation ID (0x6FFF) or a newly assigned and registered ID.

In accordance with an exemplary embodiment, the rationale for allowing the negotiation of the ID is two-fold: first, it allows the temporary use of 0x6FFF or another vendor-extension ID to be used provisionally, and secondly, if a vendor-extension ID is not obtained or registered, to avoid conflicting usage of 0x6FFF (or an alternate ID) with another party making use of the same ID.

DCPI Security—Encryption and Authentication

The fact that IPP is supported over TLS/SSL encrypted connections and also supports various forms of authentication, HTTP and IPP based, and allows the implementer to define control functions or queries that are of a sensitive nature and not subject to "man in the middle" attacks. In addition, since IPP is supported over TLS/SSL encrypted connections, it can also allow for secure authentication.

In accordance with an exemplary embodiment, security and authentication can be another area in which DCPI leverages on HTTP and IPP by virtue of its encapsulation in these protocols with proven security methods.

FIG. 1 is an illustration of a system 100 having an exemplary request/response flow and client/MFP interaction in accordance with an exemplary embodiment. As shown in FIG. 1, to illustrate the use of the system and method as disclosed, a special request, for example, Get-Debug-Log is defined. In accordance with an exemplary embodiment, the op-code for Get-Debug-Log can be defined as 0x0011.

As shown in FIG. 1, the flow of control for this request is illustrated, which includes at least one client device 110, which is preferably a DCPI client 112, for example, a PC running Mac OS, Windows, Linux or any OS that contains an IPP Client, and a host device 120, for example, an MFP 122. The client device 110 can include a processor or central processing unit (CPU), and one or more memories for storing software programs and data (such as files to be printed). The processor or CPU carries out the instructions of a computer program, which operates and/or controls at least a portion of the functionality of the at least one client device 110.

As set forth above, the client device 110 includes an operating system (OS), which manages the computer hardware and provides common services for efficient execution of various software programs. The software programs can include, for example, application software and printer driver software. For example, the printer driver software controls a multifunction printer or printer, for example, a host device 120 (for example, an MFP 122) connected with the client device 110 in which the printer driver software is installed via a communication network 170. In certain embodiments, the printer driver software can produce a print job and/or document based on an image and/or document data. In addition, the printer driver software can control transmission of the print job from the client device 110 to the host device 120, for example, in the form of a multifunction peripheral or printer.

In accordance with an exemplary embodiment, the host device 120 may be embodied by a printer, a Multi-Functional Peripheral (MFP), an image forming apparatus and other known apparatuses, which prints an image on a printing medium (or a recording medium) such as a sheet of paper based on printing data generated by the at least one client device 110. In accordance with an exemplary embodiment, the host device 120 is a Multi-Functional Peripheral/Device (MFP/MFD) 122, which can include at least a copy function, an image reading function, and a printer function, and forms an image on a sheet based on a print job (print instruction) sent from at least one second host (the client device) 110, image data read by an image reading section, such as a scanner, provided in the host device (or MFP/MFD) 120, or the like.

In accordance with an exemplary embodiment, the host device 120 in the form of a MFP can include a printer controller (or firmware), a primary memory section such as Dynamic Random Access Memory (DRAM) and a secondary one, preferably in the form of a hard disk drive (HDD), an image processing section (or data dispatcher), a print engine, and an input/output (I/O) section. The controller of the host device 120 can include a central processing unit (CPU), a random access memory (RAM), and a read only memory (ROM). The central processing unit can be configured to execute a sequence of stored instructions (for example, a computer program). The controller can include an operating system (OS), which acts as an intermediary between the software programs and hardware components within the host device 120. The operating system (OS) manages the computer hardware and provides common services for efficient execution of various application software. In accordance with an exemplary embodiment, the controller processes the data and job information received from the client device 110 and generates a print image.

The image processing section carries out image processing under the control of the controller, and sends the processed print image data to the print engine. The image processing section is preferably capable of processing multiple print jobs or sub-jobs in parallel and independently. For example, the image processing section can include a CPU that contains multiple cores therein to realize the multiple raster image processor (RIP) modules explained in detail later. The CPU used constituting a part of the controller can be commonly used for the image processing section. The print engine forms an image on a recording sheet based on the image data sent from the image processing section. The I/O section performs data transfer with the at least one client device 110. The controller can be programmed to process data and control various other components of the multifunction peripheral or printer to carry out the various methods described herein. The hard disk drive (HDD) or storage device stores digital data and/or software programs for recall by the controller. In accordance with an exemplary embodiment, the digital data includes resources, which can include graphics/images, logos, form overlays, fonts, etc.

Examples of a host device 120 in the form of a Multi-Functional Peripheral (MFP) or image forming apparatus consistent with exemplary embodiments include, but are not limited to, a laser beam printer (LBP), a multifunction laser beam printer including copy function, an ink jet printer (IJP), a thermal printer (for example, a dye sublimation printer) and a silver halide printer. For example, the MFP or image forming apparatus can be a color printer or a black and white (B/W) printer.

In accordance with an embodiment, the at least one client device 110, which may be embodied by a computer system, and generates the printing data usable in the host device 120 and transmits the generated printing data to the host device 120. The host device 120 and the at least one client device 110 can constitute an image forming system to install a communication port, to generate printing data, and to perform a printing operation of forming an image on a printing medium according to the printing data.

In accordance with an exemplary embodiment, the at least one client device 110 can be a plurality of personal computers, and can have the function of sending a print job to the host device 120 in the form of a multifunction peripheral (MFP) or an image forming apparatus 122. A printer driver program (hereinafter, sometimes simply referred to as a printer driver) is installed in the at least one client device 110, and the at least one client device 110 can use the function of the printer driver to generate a print job including the data of print conditions to be applied at the time of image formation, image data, and the like, and to send the generated print job to the host device 120 in the form of a multifunction peripheral or printer.

In accordance with an exemplary embodiment, the at least one client device 110 and the at least one host device 120 can be connected to one another via communication network 170, for example, a LAN. For example, the communication network 170 can be a public telecommunication line and/or a network (for example, LAN or WAN) 170. Examples of the communication network 170 can include any telecommunication line and/or network consistent with embodiments of the disclosure including, but are not limited to, telecommunication or telephone lines, the Internet, an intranet, a local area network (LAN) as shown, a wide area network (WAN) and/or a wireless connection using radio frequency (RF) and/or infrared (IR) transmission.

As shown in FIG. 1, the DCPI client 112 sends an initial (or first) request 130 having an extension operation-id ("IPP vendor extension operation-id") to the MFP 122. The MFP 122 sends a first response 140 to the DCPI client 120 with an extension operation-id. The first response 140 contains the "IPP vendor extension operation-id" to be used in subsequent requests. In accordance with an exemplary embodiment, if the "IPP vendor extension operation-id" has been registered with the Printing Working Group, then the registered operation-id can be used in the first request 130 and the same ID can be returned in the response 140.

In return, the DCPI client 112 sends a request action 150, for example, Get-Debug-Log op-code to the MFP 122. In accordance with an exemplary embodiment, the op-code for Get-Debug-Log can be defined, for example, as 0x0011. The MFP 122 can respond by sending the Debug Log or an error-code. For example, as shown in FIG. 1, the response data 160 can be sent to the DCPI client 112 in one or more segments of data 162, 164, 166. For example, as shown in FIG. 1, the Get-Debug-Log response 160 can be transmitted in multiple segments, which would be the case if the length of the log file is not known or the log file exceeds the maximum number of bytes allowed by the TLV-Length field as disclosed, for example, under "Special TLVs Notes."

Figure 2:
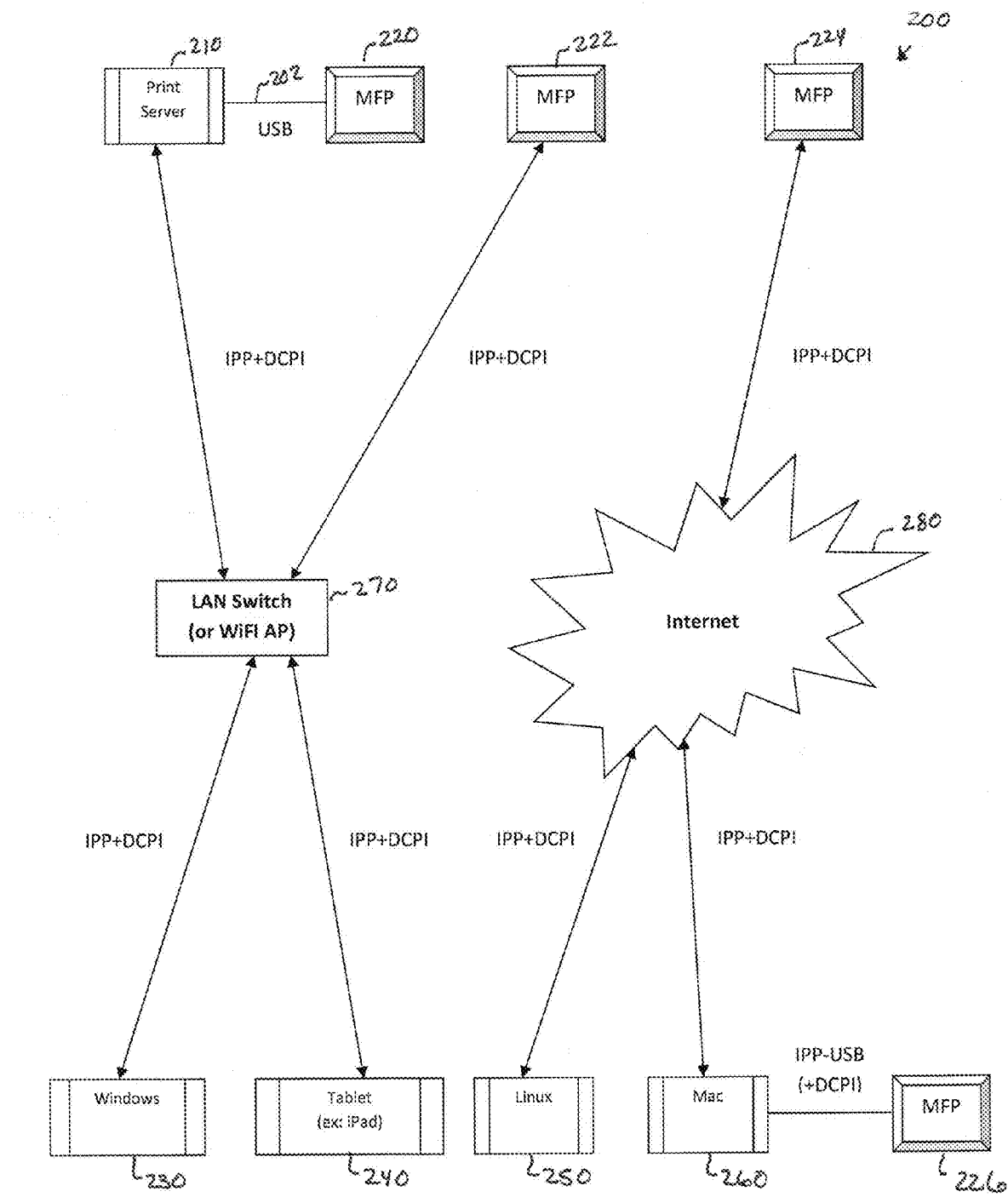
FIG. 2 is an illustration of exemplary client(s) and MFPs control over LAN, WiFi, and/or Internet in accordance with an exemplary embodiment.

FIG. 2 is an illustration of an exemplary client(s) and MFP control over a communication network 170, for example, LAN, WiFi, and/or Internet in accordance with an exemplary embodiment. As shown in FIG. 2, a subset of DCPI client platforms and their connectivity to MFP target devices are illustrated, which can include, for example, a printer server 210 connected to a MFP 220 via USB connection 202. Alternatively, the printer server 210 or MFP 222 can be connect to a LAN switch (or WiFi AP) 270 via an IPP+DCPI connection to a windows PC 230, a tablet 240, for example an iPad®. Alternatively, an MFP 224 can be connected via an Internet connection 280 via IPP+DCPI to a Linux device 250, a Mac® 260, which can be connected to an MFP 226 via IPP-USB (+DCPI), or any combinations thereof.

In accordance with an exemplary embodiment, the method and system disclosed herein can have a number of alternative applications. For example, the method and system can be used or implemented independent of HTTP+IPP. In such case/usage, the security features provided by these protocols may be lost. However, as long as a secure channel of communication is available (in-band or out-band) the method and system can be used for sensitive/proprietary device control functions.

In accordance with another exemplary embodiment, the device control protocol described in this disclosure can also be used to control devices other than MFPs. For example, such variations should define and include a secure form of encryption and authentication. In accordance with an exemplary embodiment, devices of particular interest to which the invention can be applied can include embedded systems and devices that fall under the category of "Internet of Things" which can be described as follows: The "Internet of Things" (IoT) is the network of physical objects or "things" embedded with electronics, software, sensors, and network connectivity, which enables these objects to collect and exchange data. For example, IoT devices can be found in a variety of home, vehicle, appliance and other various other environments and applications.

In accordance with an exemplary embodiment, an alternative usage of DCPI would be to act as a "Tunneling Protocol" to carry an insecure protocol within its payload. Since IPP supports TLS encryption (via HTTPS and IPPS), a DCPI op-code and TLVs could be defined to describe the protocol embedded in the DCPI payload.

In accordance with another exemplary embodiment, another exemplary use could be to enable DCPI to carry TCP/IP and other in a connection like IPP-USB in which the only two protocols used between client and MFP are HTTP and IPP carried over the Universal System Bus. This would take a form very much like DCPI as a tunneling protocol.

In accordance with an exemplary embodiment, a non-transitory computer readable medium containing a computer program having computer readable code embodied to carry out a method of encapsulating a request for a device specific control function that causes one or more host devices to act or perform a requested action is disclosed, wherein each of the one or more host devices are configured to support Internet Printing Protocol (IPP) protocol server functionality, the method comprising: sending an initial request in an operation-id/status-code and a data field of an IPP request to a host device from a client device, the client device configured to support IPP client functionality; receiving an initial response from the host device in the operation-id/status-code and the data field of the IPP request, the initial response responding to the initial request received on the host device; sending a DCPI request for a requested action to the host device, wherein the request for the requested action is defined in an operation-code (op-code) and Type-Length-Value (TLV) fields of the DCPI request; and receiving a status or a return-code of the requested action from the host device and optional data in the TLV fields.

In accordance with an exemplary embodiment, a non-transitory computer readable medium containing a computer program having computer readable code embodied to carry out a method of encapsulating a request for a device specific control function that causes one or more host devices to act or perform a requested action is disclosed, wherein each of the one or more host devices are configured to support Internet Printing Protocol (IPP) protocol server functionality, the method comprising: receiving an initial DCPI request in an operation-id/status-code and a data field of an IPP request from a client device, the client device configured to support IPP client functionality; sending an initial DCPI response to the client device in the data field of the IPP response; receiving a DCPI request for a requested action from the client device, wherein the request for the requested DCPI action is defined by an operation code (op-code) and Type-Length-Value (TLV) fields of the DCPI request; and sending a response to the client device, wherein the response includes a status or return-code of the requested action and optional data represented in the TLV fields.

The non-transitory computer readable medium may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of encapsulating a request for a device specific control function that causes one or more host devices to act or perform a requested action, wherein each of the one or more host devices are configured to support Internet Printing Protocol (IPP) protocol server functionality, the method comprising:
   sending an initial request in an operation-id field and data fields of an IPP request to a host device from a client device, the client device configured to support IPP client functionality;
   receiving the initial request from the client device on the host device;
   sending an initial response from the host device to the client device in a data field of the IPP response;
   receiving the initial response on the client device;
   sending a Device Control Protocol over IPP (DCPI) request for a requested action to the host device, wherein the DCPI request for the requested action is defined by an operation code (op-code) and Type-Length-Value (TLV) fields contained in the data field of the IPP request; and
   sending a response to the client device, wherein the response includes a status or return-code of the requested action and optional data in the TLV fields.

2. The method of claim 1, wherein the DCPI request includes:
   a signature field, the signature field configured to identify the host device and/or a unique key that verifies that a data field of an IPP request/response is being used to embed the request for the device specific control function;
   the operation-code (op-code) field;
   a request-id, the request-id being a unique identifier used to match a response to a request; and
   the TLV fields.

3. The method of claim 1, wherein the IPP operation-id field is selected from a range of vendor-extensions, and wherein each of the vendor-extension operation-ids is unique to the host device.

4. The method of claim 1, wherein the Type-Length-Value (TLV) fields of the DCPI request can include one or more of the following:
   an end marker, which marks an end of a TLV group; and/or
   a data marker, which identifies data that is to be sent in a plurality of requests or responses.

5. The method of claim 2, wherein the requested action comprises one or more of the following:
   action operations represented in the DCPI op-code field, wherein the action operations are device specific control functions that cause the host device to act on or perform the requested action and return a response or return-code that indicates success or failure and optional data in one or more of the TLV fields;
   query operations represented in the DCPI op-code field, wherein the query actions retrieve specific and internal target host device data/reports; and/or
   sessions represented in the DCPI op-code field, wherein the sessions are continuous requests/responses containing data payloads flowing in both directions, which are exchanged between the client device and the host device.

6. The method of claim 1, comprising:
   connecting the client device to the host device through a network connection or USB connection.

7. The method of claim 1,
   wherein the client device is a personal computer running an Operating System (OS); and
   wherein the host device is a Multi-Functional Peripheral (MFP).

8. A non-transitory computer readable medium containing a computer program executed by a processor within a client device, the computer program having computer readable code embodied to execute a process of encapsulating a request for a device specific control function that causes one or more host devices to act or perform a requested action, wherein each of the one or more host devices are configured to support Internet Printing Protocol (IPP) protocol server functionality, the process comprising:
   sending an initial request in an operation-id/status-code and a data field of an IPP request to a host device from the client device, the client device configured to support IPP client functionality;
   receiving an initial response from the host device in the operation-id/status-code and the data field of the IPP request, the initial response responding to the initial request received on the host device;

sending a Device Control Protocol over IPP (DCPI) request for a requested action to the host device, wherein the request for the requested action is defined in an operation-code (op-code) and Type-Length-Value (TLV) fields of the DCPI request; and receiving a status or a return-code of the requested action from the host device and optional data in the TLV fields.

9. The readable medium of claim 8, wherein the DCPI request includes:
a signature field, the signature field configured to identify the host device and/or a unique key that verifies that a data field of an IPP request/response is being used to embed the request for the device specific control function;
the operation-code (op-code) field;
a request-id, the request-id being a unique identifier used to match a response to a request; and
the TLV fields, which specify parameters of the DCPI request.

10. The readable medium of claim 8, wherein an IPP operation-id field is selected from a range of vendor-extensions, and wherein each of the vendor-extension operation-ids is unique to the host device.

11. The readable medium of claim 8, wherein the Type-Length-Value (TLV) fields of the DCPI request can include one or more of the following:
an end marker, which marks an end of a TLV group; and/or
a data marker, which identifies data that is to be sent in a plurality of responses.

12. The readable medium of claim 9, wherein the requested action comprises one or more of the following:
action operations represented in the DCPI op-code field, wherein the action operations are device specific control functions that cause the host device to act on or perform the requested action and return a response or return-code that indicates success or failure;
query operations represented in the DCPI op-code field, wherein the query actions retrieve specific and internal target host device data/reports; and/or
sessions represented in the DCPI op-code field, wherein the sessions are continuous requests/responses containing data payloads flowing in both directions, which are exchanged between the client device and the host device.

13. The readable medium of claim 8, comprising:
connecting the client device to the host device through a network connection or USB connection;
wherein the client device is a personal computer running an Operating System (OS); and
wherein the host device is a Multi-Functional Peripheral (MFP).

14. A non-transitory computer readable medium containing a computer program executed by a processor within a host device, the computer program having computer readable code embodied to execute a process of encapsulating a request for a device specific control function that causes the host device to act or perform a requested action, wherein the host device is configured to support Internet Printing Protocol (IPP) protocol server functionality, the process comprising:
receiving an initial Device Control Protocol over IPP (DCPI) request in an operation-id/status-code and a data field of an IPP request from a client device, the client device configured to support IPP client functionality;

sending an initial DCPI response to the client device in the data field of the IPP response;
receiving a DCPI request for a requested action from the client device, wherein the request for the requested DCPI action is defined by an operation code (op-code) and Type-Length-Value (TLV) fields of the DCPI request; and
sending a response to the client device, wherein the response includes a status or return-code of the requested action and optional data represented in the TLV fields.

15. The readable medium of claim 14, wherein the DCPI request includes:
a signature field, the signature field configured to identify the host device and/or a unique key that verifies that a data field of an IPP request/response is being used to embed the request for the device specific control function;
the operation-code (op-code) field;
a request-id, the request-id being a unique identifier used to match a response to a request; and
the TLV fields.

16. The readable medium of claim 14, wherein the operation-id field is selected from a range of vendor-extensions, and wherein each of the vendor-extension operation-ids is unique to the host device.

17. The readable medium of claim 14, wherein the Type-Length-Value (TLV) fields of the DCPI request can include one or more of the following:
an end marker, which marks an end of a TLV group; and/or
a data marker, which identifies data that is to be sent in a plurality of requests or responses.

18. The readable medium of claim 15, wherein the requested action comprises one or more of the following:
action operations represented in the DCPI op-code field, wherein the action operations are device specific control functions that cause the host device to act on or perform the requested action and return a response or return-code that indicates success or failure;
query operations represented in the DCPI op-code field, wherein the query actions retrieve specific and internal target host device data/reports; and/or
sessions represented in the DCPI op-code field, wherein the sessions are continuous requests/responses containing data payloads flowing in both directions, which are exchanged between the client device and the host device.

19. The readable medium of claim 14, comprising:
connecting the client device to the host device through a network connection or USB connection;
wherein the client device is a personal computer running an Operating System (OS); and
wherein the host device is a Multi-Functional Peripheral (MFP).

20. A system for encapsulating a request for a device specific control function that causes one or more host devices to act or perform a requested action, wherein each of the one or more host devices are configured to support Internet Printing Protocol (IPP) protocol server functionality, the system comprising:
a client device, a host device of the one or more host devices, and a communication network, which connects the client device to the host device;
wherein the client device and the host device are configured to:

send an initial Device Control Protocol over IPP (DCPI) request in the operation-id and a data field of an IPP request to the host device from the client device, the client device configured to support IPP client functionality;
receive the initial DCPI request from the client device on the host device;
send an initial DCPI response from the host device to the client device in the data field of the IPP response;
receive the initial response on the client device;
send a DCPI request for a requested action to the host device, wherein the request for the requested action is defined by the op-code and Type-Length-Value (TLV) fields contained in the data field of the IPP request; and
send a DCPI response contained in the IPP data field to the client device, wherein the response includes a status or return-code of the requested action and optional data in the TLV fields, and wherein the requested action comprises one or more of the following:

action operations represented in a DCPI operation-code (op-code) field, wherein the action operations are device specific control functions that cause the host device to act on or perform the requested action and return a response or return-code that indicates success or failure and optional data in the TLV fields;

query operations represented in the DCPI op-code field, wherein the query actions retrieve specific and internal target host device data/reports; and/or sessions represented in the DCPI op-code field, wherein the sessions are continuous requests/responses containing data payloads flowing in both directions, which are exchanged between the client device and the host device.

* * * * *